Nov. 17, 1959 E. V. NAYBOR 2,912,863
PRESSURE TRANSDUCER
Filed April 1, 1955 4 Sheets-Sheet 1
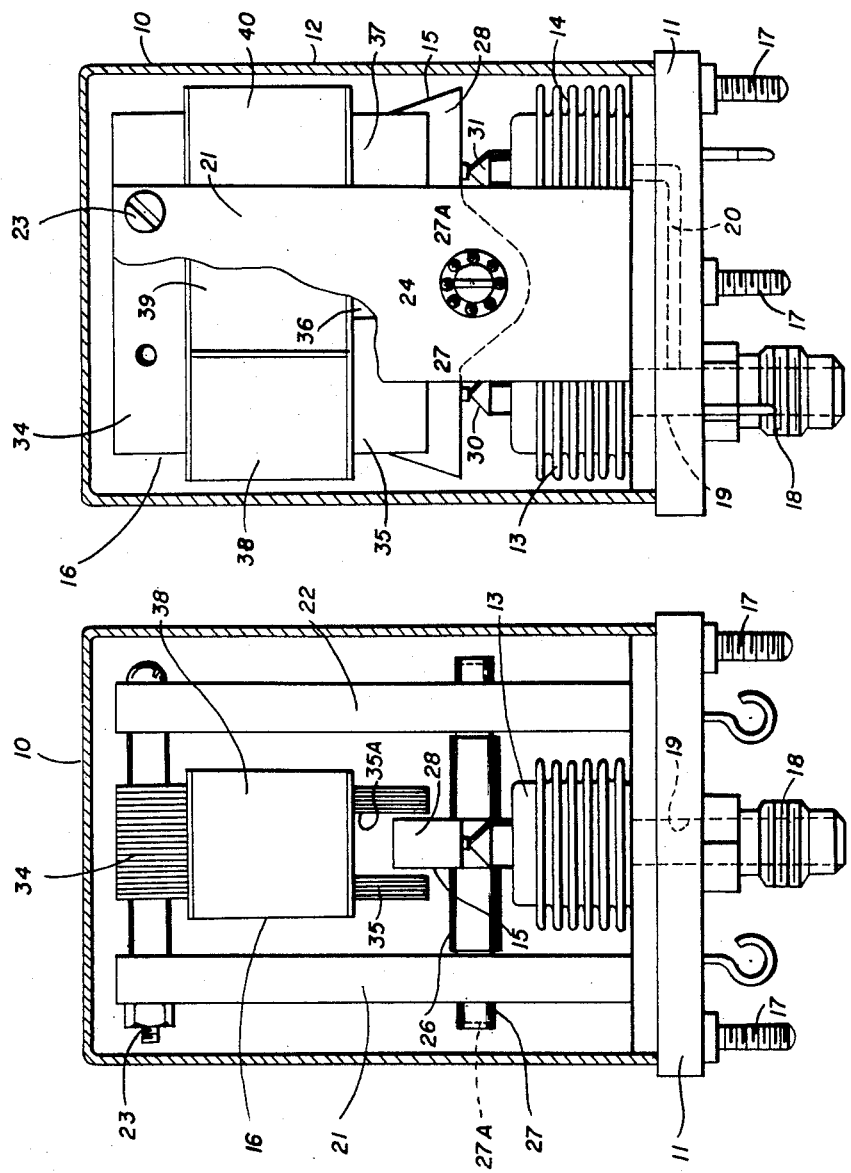
INVENTOR.
E.V. NAYBOR
BY John C. McBrynn Nov. 17, 1959  E. V. NAYBOR  2,912,863
PRESSURE TRANSDUCER
Filed April 1, 1955  4 Sheets-Sheet 2

INVENTOR.
E. V. NAYBOR
BY
John C. McGregor

Nov. 17, 1959

E. V. NAYBOR 2,912,863

PRESSURE TRANSDUCER

Filed April 1, 1955

INVENTOR.
E.V. NAYBOR
BY
John C. McGregor

Nov. 17, 1959 E. V. NAYBOR 2,912,863
PRESSURE TRANSDUCER
Filed April 1, 1955 4 Sheets-Sheet 4

INVENTOR.
E. V. NAYBOR
BY
John C. McGregor

United States Patent Office 2,912,863
Patented Nov. 17, 1959

2,912,863

PRESSURE TRANSDUCER

E. Vincent Naybor, Port Washington, N.Y.

Application April 1, 1955, Serial No. 498,733

7 Claims. (Cl. 73—398)

This invention relates to pressure transducers and in particular to pressure transducers capable of sensing, utilizing and controlling high pressures.

Pressure responsive instruments of the type with which the present invention is concerned depend for their operation on the use of pressure expansible units such as bellows or the like to translate fluid pressures into kinetic energy for driving pointers or producing control voltages and other output parameters. In general such instruments tend to be delicate, being affected by shock or vibration. Moreover, they are often limited in their ability to accommodate high fluid pressures by the limitations which inhere in many pressure expansible units. Although bellows, for example, can be obtained commercially to handle relatively high pressures, their displacement or excursion tends to be so extreme that the bellows' life is seriously shortened.

It is therefore one object of the present invention to provide a pressure transducer of simplified design having extremely long life.

It is another object of the invention to provide a pressure transducer capable of utilizing and controlling higher pressures than would be normally possible using like pressure extensible devices.

Another object of the invention is to provide a pressure transducer capable of use with high fluid pressure sources and which can utilize commercially available extensible units such as bellows or the like having inherently low spring resistance.

Another object of the invention is to provide a pressure transducer having extremely high accuracy and which is inherently balanced with regard to shock and vibration.

Another object of the invention is to provide a pressure transducer which is relatively insensitive to ambient temperature changes or to changes in the temperature of the pressurized medium to which the transducer responds.

Another object of the invention is to provide a pressure transducer which is highly sensitive in its initial response characteristics and which can be utilized to afford an output signal or indication which is representative of absolute fluid pressure as well as a rate of change of the fluid pressure.

In accordance with the present invention, a pair of pressure expansible units are so arranged that one enjoys a slight and preferably adjustable mechanical advantage over the other. In one preferred arrangement the units are coupled to react against each other through a motion modifying connecting linkage and fluid pressure from a common source is introduced into both units simultaneously.

The resulting motion of the connecting linkage can be translated into pointer motion or into an output signal, such for example as, an electrical voltage. The latter can be achieved in accordance with the invention in the form of an E.M.F. which is proportional to the fluid input pressures by integrating the connecting linkage between the expansible units and a signal source such for example as a synchro-transformer, E-core differential transformer or variable inductor, capacitor or resistor. If desired, the output of the signal source can be made phase sensitive to its exciting voltage in the case of the synchro-transformer or E-core differential transformer.

The sensitivity of the transducer to pressure changes can be increased in accordance with the invention by admitting the fluid pressure to the several expansible units through different size conduits, the conduit admitting the fluid to the unit having the mechanical advantage over the other being the larger. Moreover, the use of different input conduits to the units from the same pressure source can be utilized to derive an output from the transducer which is representative of the rate of change of the source pressure or a combination of absolute source pressure and its rate of change.

Representative embodiments of the invention from which the above and other features will be readily understood are described below having reference to the accompanying drawings in which:

Figure 1 is an end view of a pressure transducer unit formed in accordance with the present invention with the external housing therefor broken away in vertical section;

Figure 2 is a side view of the pressure transducer of Figure 1, also showing the housing therefor broken away in vertical section;

Figure 3:
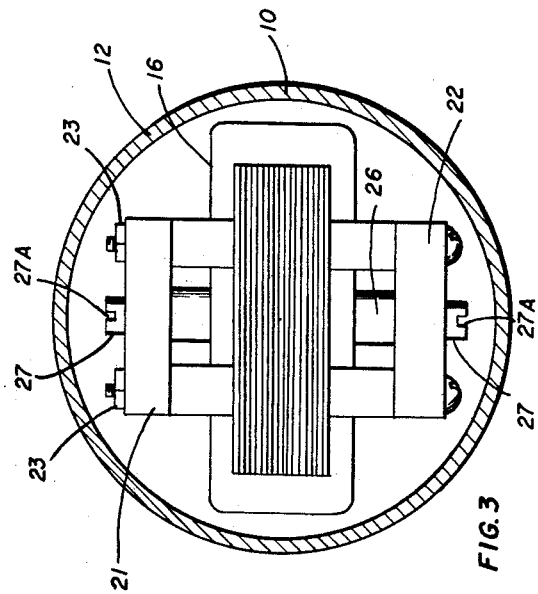
Figure 3 is a top view of the transducer of Figures 1 and 2 with the housing therefor broken away in horizontal section.

Referring first to Figures 1–5, the invention is illustrated as embodied in a pressure transducer unit 10 including a circular base 11 having a generally cylindrical cover 12 attached thereto to form a housing for a pair of pressure extensible units which can take the form of units 13 and 14 coupled through motion modifying connecting linkage identified generally by the numeral 15 to output means which can take the form of a signal source such as a variable E.M.F. transformer identified generally by the numeral 16. Extending downwardly from the base 11 are suitable mounting members such as threaded studs 17 and a pressure line coupling connector 18 serving as a manifold for introducing fluid under pressure to the insides of the units 13 and 14 via conduits 19 and 20, respectively.

Figure 4:
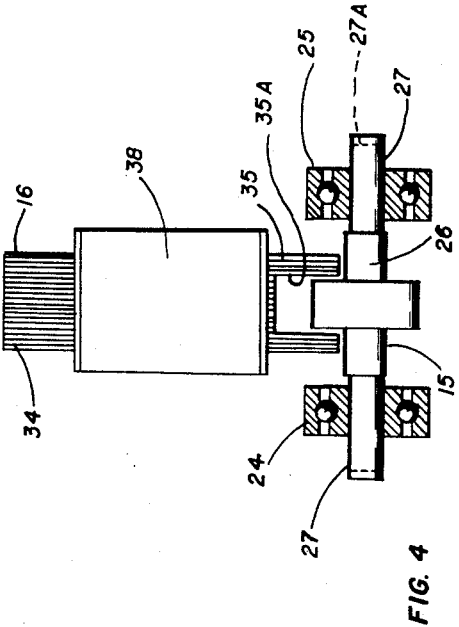
Figure 4 is a diagrammatic view of the signal source section of the transducer of Figures 1–3 viewed in its orientation of Figure 1.
Figure 5:
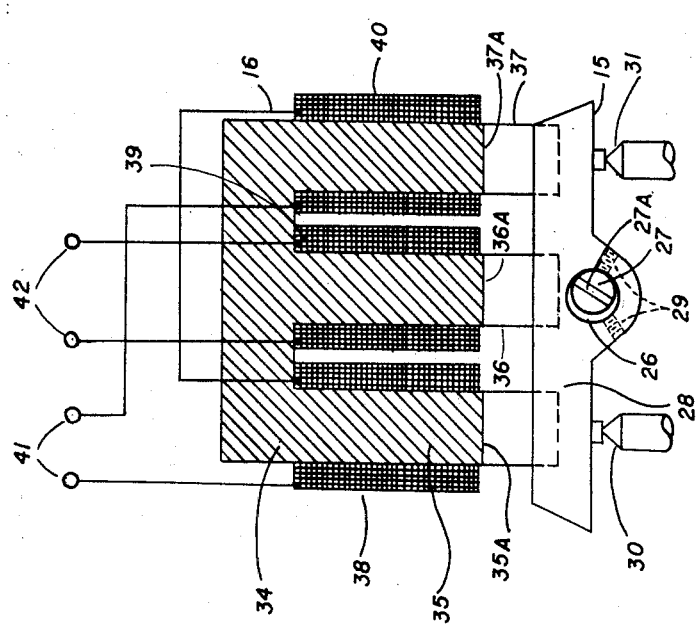
Figure 5 is a side view of the signal source section of the transducer of Figure 4 viewed in the orientation of Figure 2.

Mounted on the base 11 within the cover 12 are a pair of upright supports 21 and 22 between the upper ends of which the signal source 16 is affixed as by bolting means 23, for example, and in the intermediate portions of which is journalled the motion modifying connecting means 15 by means of suitable bearings such for example as ball bearings 24 and 25 as best seen in Figure 4. The motion modifying connecting means 15 can include an arbor 26 on either end of which is formed an extension 27, themselves coaxial but each of which is eccentric with respect to the axis of the arbor 26 as best seen in Figure 5. One or both of the eccentric extensions 27 can be formed at its free end with a slot 27a for receiving a screw driver for purposes of adjustment to be described below. Adjustably mounted on the arbor 27 is a crosspiece 28 which performs the compound function of a motion modifier or lever between the units 13 and 14 and the armature of the signal source 16. A pair of set screws 29 secure the crosspiece 28 to the arbor 26 and facilitate such adjustments as might be necessary.

As best seen in Figure 2, the units 13 and 14 which are secured to the base 11, are also joined to the crosspiece 28 through fixed pintle bearings 30 and 31, respectively, and disposed on opposite sides of the axis of the arbor 26. Thus, it will be seen that the two units 13 and 14, the upper ends of which move upwardly under the influence of positive pressure introduced into each through the connector 18, work against each other through the agency of the crosspiece or motion modifying lever 28. With the mechanical advantage of the lever 28 arranged to favor say the unit 13 and with equal fluid pressures introduced into both units, the crosspiece 28 will be caused to rock in a clockwise direction about the aligned axis of the eccentric arbor extensions 27, the unit 13 expanding and the unit 14 compressing.

The mechanical advantage gained by one unit over the other is adjustable by means of the eccentricity of the arbor extensions 27 with respect to the arbor 26, the adjusting procedure involving backing off the set screws 29 to free the arbor from the crosspiece 28 (Figure 5) and then turning the arbor by means of the screw driver slots 27A, for example, to shift the crosspiece 28 in translation relatively to the axis of the bearings 24 and 25 in which the arbor and hence the crosspiece 28 are normally journalled. Thus, referring to Figure 5, the eccentricity of the arbor with respect to its extensions is arranged to shift the crosspiece 28 as far to the left as it will go, thereby shifting the pintle bearing 31 of the unit 14 closer to the rocking axis and shifting the pintle bearing 30 of the unit 13 away from the rocking axis. It will be understood that the flexibility which inheres in the units 13 and 14 affords compliance necessary for the shift. So adjusted the unit 13 enjoys a mechanical advantage over the unit 14.

Figure 8:
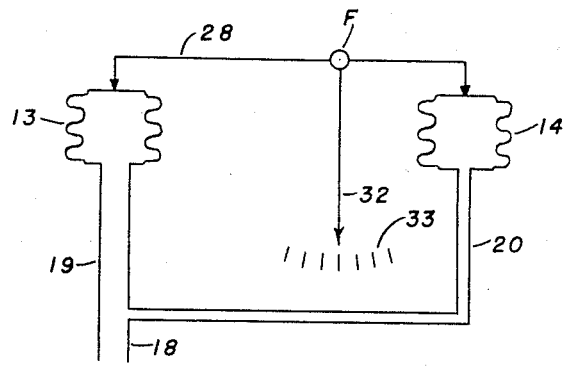

This arrangement is shown diagrammatically in Figure 8 in which like reference numerals identify parts corresponding to those of Figures 1–5, the fulcrum of the crosspiece 28 (corresponding to the axes of the arbor extensions 27) being identified by the letter F. Assuming for the moment that equal fluid pressures obtains in the units 13 and 14, the crosspiece 28 will be rocked about the fulcrum F by an amount directly proportional to the fluid pressure in the expansible units. The output is indicated simply by a pointer 32 working in conjunction with fixed calibrations 33.

In the arrangement of Figures 1–5, however, the output is derived from the signal source 16 which can take the form of an E core differential transformer including a three legged laminated core 34, the three legs 35, 36 and 37 of which are formed with aligned slots 35A, 36A, and 37A, respectively, to receive the crosspiece 28 which so mounted assumes its armature function. As best seen in Figure 1, the crosspiece 28 is formed with side walls which are parallel to each other and to the opposing walls of the core leg slots as represented by the slot 35A. In this fashion, parallel gaps are provided between the armature and the pole ends, which arrangement can be utilized to produce, if such is desired, a linear output voltage for very small rotary displacements of the armature. Moreover, this arrangement of armature and pole pieces reduces magnetic pull which would coerce the instrument.

The transformer is completed by means of windings 38, 39 and 40 wound about the core legs 35, 36 and 37, respectively, the windings 38 and 40 being connected in series opposition across a pair of output terminals 41 and the winding 39 being connected across a pair of input terminals 42. By energizing the winding 39 from a suitable source of A.C., a modulated output signal appears at the terminals 41 which is directly proportional to the rocking of the crosspiece 28 which is in turn directly proportional to the fluid pressure in expansible units 13 and 14, i.e., the pressure at the fluid input connector 18.

It will be observed that the conduit 20 to the unit 14 is considerably smaller than the conduit 19 to the unit 13. It has been found in accordance with the present invention that this restriction, which can take the form of a small orifice, produces a lag in the movement of the unit 14 during pressure changes, thus providing an increased response to pressure changes. This initial force provides for the overcoming of starting friction both in the transducer and in any associated equipment which might be driven thereby. Thus, for example, it is useful in overcoming the pen to paper friction in recording instruments in which the crosspiece 28 would be coupled either directly or indirectly to the pen. Using inlet conduits or orifices to the two units 13 and 14 which are of widely differing dimension, the device can be utilized to develop an output signal which is proportional only to the rate of change of pressure, this output parameter preferably being derived by adjusting the arbor 26 to balance precisely the crosspiece 28 so that the units 13 and 14 come into balance, neither having a mechanical advantage over the other. Operated as a rate of change device, the output signal can be made positive or negative depending on in which expansible unit the restricting orifice is placed.

If both the lever lengths and inlet orifices to the units are varied in combination, a displacement of the crosspiece 28 can be achieved which is proportional to both pressure and the rate of change of pressure. Information such as this can be used as feedback data, for example, in hydraulic and pneumatic servo systems and also for measurement of pressure rates of change.

It will be understood that various other output devices in the form of signal sources responsive to motion of the crosspiece can be used, such for example as potentiometers, variable capacitors, and variable inductors, any of which can be substituted for the differential type transformer which represents a variable E.M.F. source in the arrangement of Figures 1–5.

Figure 6:
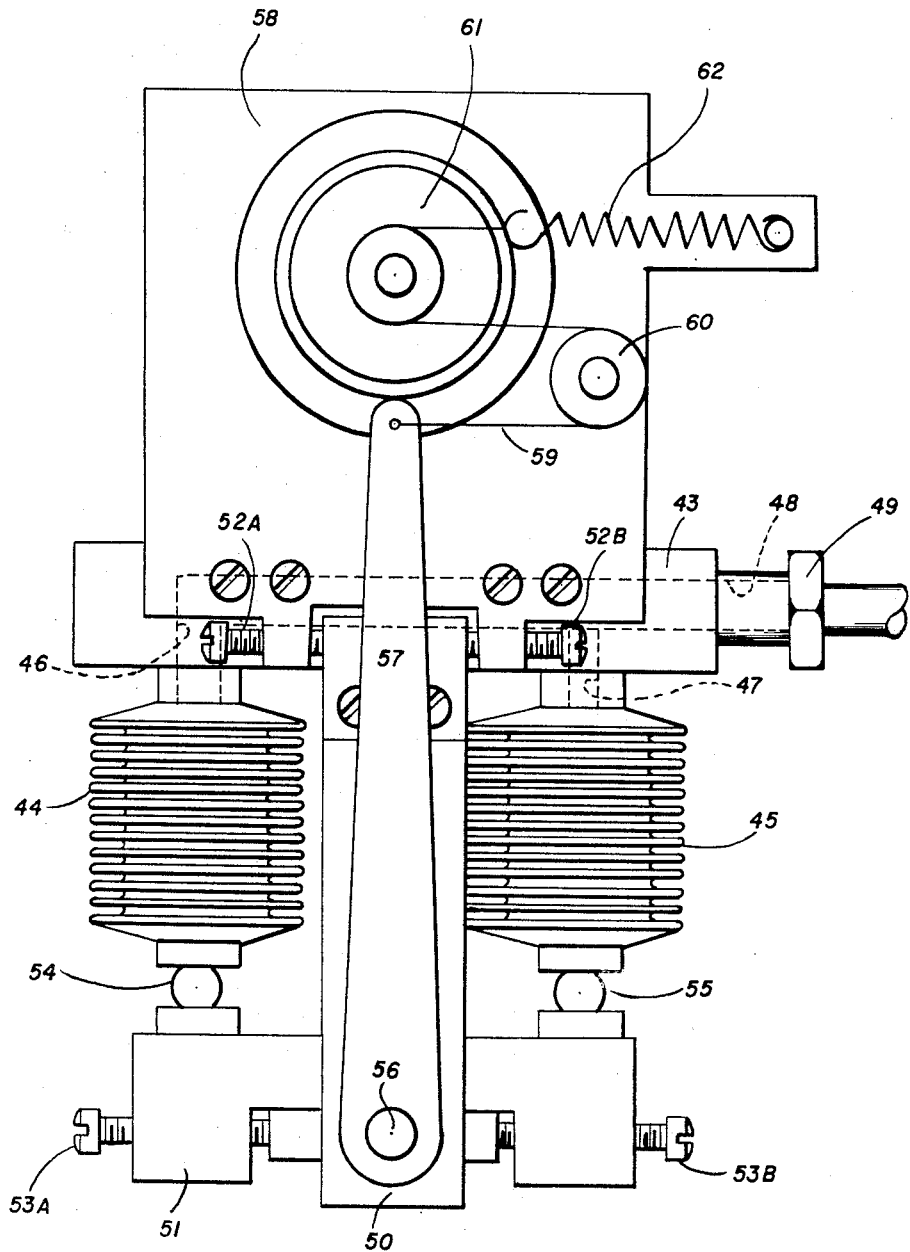
Figure 6 is an enlarged front view of a pressure transducer formed in accordance with the present invention and representing a modification of the embodiment of the invention illustrated by Figures 1–5.
Figure 7:
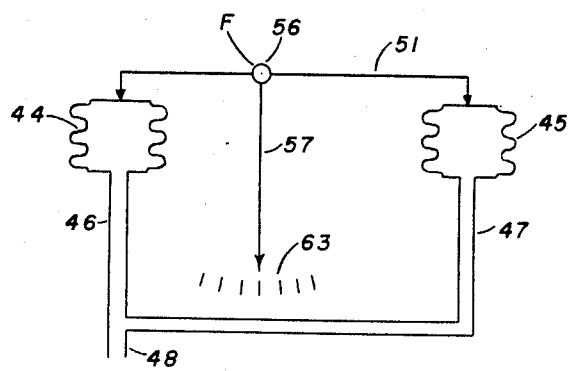
Figures 7 and 8 are schematic representations of the pressure transducers illustrating how they can be utilized to respond to absolute pressure and to rate of change of pressure, the latter resulting in highly increased response.

As indicated above, the output signal source such as the signal source 16 can take various forms. Referring to Figures 6 and 7, for example, there is shown a pressure transducer employing the same unbalanced bellows principle as the arrangement of Figures 1–5 but in a slightly different mechanical environment and embodying a signal source in the form of a synchro-transformer for which affords an A.C. output potential proportional to the pressure to which the pressure extensible units are subjected. The output signal is phase sensitive to the energizing signal, being either in phase or out of phase depending upon the angular position of its rotor.

Referring to Figure 6, there is shown a frame 43 carrying a pair of pressure extensible units 44 and 45 which are respectively connected via input conduits 46 and 47 to an input manifold 48 adapted to be coupled as by a connector 49 to an external pressure source. Adjustably carried by the frame 43 is a support 50, the depending end of which carries in a pivotal mounting a lever arm 51. The support 50 is adjustable in the frame 43 by means of opposed adjusting screws 52A and 52B and the lever 51 is adjustable relatively to the support 50 by means of a pair of opposed adjusting screws 53A and 53B by means of which the lower or moving ends of the units 44 and 45 are shifted toward or away from the fulcrum point of the lever 51. The adjusting screws 52A and 52B are capable of shifting the support 50 within the limits afforded by enlarged holes through which clamping screws are passed. In accordance with well known techniques, the clamping screws are released and the desired adjustment is effected by turning the adjusting screws, after which the clamping screws are again set up. The lever 51 is in two pieces; one having a fixed pivot and the other being moveable with respect to the first under the control of the adjusting screws 53A and 53B. The units 44 and 45 engage the lever arm 51 on opposite sides of its pivotal mounting in the arm 50 through ball joints 54 and 55, respectively.

The lever arm 51 turns with a stub shaft 56 which projects forwardly of the arm 50 and to which is anchored a pointer arm 57 of relatively long length to amplify the turning or rocking motion of the lever 51. Assuming equal fluid pressures are introduced into the units 44 and 45 and assuming the lever 51 is adjusted to afford a mechanical advantage favoring one unit over the other, the arm 57 will swing to the right or the left in direct proportion to the fluid pressure.

The arm 57 can be coupled at its free end and a signal source which can take the form of a synchro-transformer 58. To this end, the free end of the arm 57 can be linked by a cable 59 running over a fixed pulley 60 to the rotor 61 of the synchro-transformer 58, the free end of the cable being attached to the frame through a tension spring 62. Fluid pressures up to 260 p.s.i. and output voltages as high as 65 volts R.M.S. using excitation signals at 1000 cycles have been detected and developed, respectively.

Figure 7 is a schematic diagram of the mechanical section of the pressure transducer of Figure 6, with like reference numerals being used to identify like parts. In the event the arm 57 is used merely as a pointer, it will be understood that suitable complementary calibrations 63 would be used in conjunction therewith to indicate pressure or rate of change of pressure as the case might be.

In the above described arrangements, one pressure expansible unit enjoys a mechanical advantage over the other through a motion modifying coupling or linkage. It will be understood, however, that it is possible to use a balanced linkage between the units and to utilize units of differing outputs. Thus, for example, two bellows of differing diameter can be used to effect all or some part of the torque unbalance. Also, the expansible units can be connected to different rather than common fluid pressure sources.

It should be understood that in all of the above described transducers a vacuum or sub-atmospheric pressure can be detected as readily as can super-atmospheric pressures. The use of a vacuum source, would, of course, reverse the direction of rocking or turning motion of the levers 28 and 51. In either case because of the elimination of supplemental springs in connection with the action of the expansible units a high degree of accuracy is obtained. As pressure is increased the amount of force on each unit is increased by the same amount. The unit movement, therefore, is proportional to the differential torque produced by these forces, acting against the differential torque produced by the spring rate of the expansible units. Also, in the event the transducer is to be used in a way which the effects of barometric changes are not critical, an unsealed housing can be used, while for uses such as airborne instruments including altimeters or the like, a sealed housing could be used.

The pressure transducers formed in accordance with the present invention are relatively insensitive to temperature changes or to differentials between the ambient temperature of the transducer and the temperature of the medium being measured. The outside of each expansible unit is subjected to the ambient temperature of the device, while the inside of each unit is subjected to the temperature of the medium being measured. Thus, any change of spring rate due to temperature differences will be identical in each unit.

The use of the term "pressure extensible units" is intended to cover such pressure responsive devices as bellows, Bourdon tubes, capsules, pistons, flexible diaphragms, and in general any device with a spring constant or light return spring added and capable of physical movement or displacement as a function of a pressure above or below atmospheric and applied through a fluid medium, whether liquid or gaseous. Also, the use of the term "signal source" is intended to cover such devices as a synchro-transformer, E-core differential transformer, or variable inductor, capacitor or resistor.

From the foregoing description of representative embodiments of the invention, it will be understood that the invention can take numerous forms and arrangements. It should not be regarded as limited, therefore, except as defined by the following claims.

I claim:

1. In a pressure transducer, first and second pressure expansible units, fluid conduit means connected to said first and second pressure expansible units and having a common input portion connected to receive a fluid pressure, whereby the expansible units partake of motion in response thereto, connecting means joining movable portions of each unit to cause the units to react against each other, said units and connecting means being constructed and arranged to afford a mechanical advantage to one unit over the other, whereby one unit is caused to expand and the other compress at such time as a single input pressure is impressed on the input portion of said conduit means, and output means connected to said connecting means and responsive to the complementary motions of the opposed units whereby the first and second pressure expansible units partake of complementary, opposed motions in response to a given input pressure, which motions are less than would occur were either expansible unit subjected to the same pressure.

2. In a pressure transducer as set forth in claim 1, said expansible units being of substantially identical size and said linkage means including lever means having a fulcrum favoring one unit over the other.

3. In a pressure transducer as set forth in claim 1, including first and second conduit means of different diameter to connect said first and second units to a common pressure source, whereby one of the units is made more sensitive to pressure changes than the other.

4. In a pressure transducer, a frame, first and second expansible units carried by the frame and movable in response to fluid pressure, fluid conduit means to introduce fluid pressure into said units, said conduit means comprising a single inlet portion to receive a single fluid pressure and branch conduit means connecting said single portion to both of said units, whereby both units are subjected to pressure values which are a function of one pressure, a lever arm between movable portions of the units, whereby one unit reacts against the other, and a fulcrum for the lever arm including an arbor passing through the lever arm and journalled in the frame, means to secure the lever arm detachably to the arbor for turning movement therewith and eccentric means on the arbor, whereby turning movement of the arbor with the lever arm free to turn thereon causes the lever arm to be shifted in translation to change the mechanical advantages afforded one unit over the other.

5. In a pressure transducer as set forth in claim 4, said expansible units comprising bellows having their movable portions attached to said lever arm, said bellows being laterally flexible to permit translatory adjusting motion of the lever arm.

6. In a pressure transducer, a frame, first and second expansible units mounted on the frame, each affording an output motion in response to fluid pressure, motion modifying connecting linkage means between movable portions of the first and second units causing one unit to react against the other and including a centrally pivoted lever arm affording one unit a mechanical advantage over the other, and a signal source including a differential transformer having a core, exciting windings, output windings, and an armature, all carried by the frame, said armature comprising said lever arm, said transformer including three substantially co-planar, parallel legs disposed side by side, each slotted at its free end to receive portions of said lever arm, the central leg being disposed adjacent to the pivot of the lever arm and the other two legs being disposed adjacent to the respective ends of the lever arm, thereby to provide a mechanical assembly relatively free of magnetic coercion by said E.M.F. device.

7. In a pressure transducer as set forth in claim 6, the core of said transformer including a plurality of legs, each slotted at its free end to receive said armature-lever arm, thereby to provide a mechanical assembly relatively free of magnetic coercion by said E.M.F. device.

References Cited in the file of this patent

UNITED STATES PATENTS

| | | |
|---|---|---|
| 130,878 | Stiles | Aug. 27, 1872 |
| 2,136,798 | Lucas | Nov. 15, 1938 |
| 2,174,872 | De Giers | Oct. 3, 1939 |
| 2,541,512 | Hahn | Feb. 13, 1951 |
| 2,598,681 | Garbarini et al. | June 3, 1952 |
| 2,669,129 | Williams | Feb. 16, 1954 |
| 2,688,253 | Markson | Sept. 7, 1954 |
| 2,692,357 | Nilson | Oct. 19, 1954 |
| 2,729,968 | Segerstadt et al. | Jan. 10, 1956 |
| 2,786,481 | Donaldson | Mar. 26, 1957 |
| 2,816,444 | Gomez | Dec. 17, 1957 |

FOREIGN PATENTS

| | | |
|---|---|---|
| 371,081 | Germany | Mar. 10, 1927 |
| 1,058,649 | France | Nov. 4, 1953 |